(12) United States Patent
Jackson et al.

(10) Patent No.: US 10,038,794 B2
(45) Date of Patent: *Jul. 31, 2018

(54) SYSTEM FOR COMMUNICATING WITH AN INTERNET PROTOCOL MULTIMEDIA SUBSYSTEM NETWORK

(71) Applicant: AT&T INTELLECTUAL PROPERTY I, LP, Atlanta, GA (US)

(72) Inventors: James Jackson, Austin, TX (US); Niral Sheth, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 509 days.

This patent is subject to a terminal disclaimer.

(21) Appl. No.: 14/842,248

(22) Filed: Sep. 1, 2015

(65) Prior Publication Data

US 2015/0373202 A1 Dec. 24, 2015

Related U.S. Application Data

(63) Continuation of application No. 11/760,255, filed on Jun. 8, 2007, now Pat. No. 9,154,526.

(51) Int. Cl.
*H04L 12/66* (2006.01)
*H04M 7/00* (2006.01)
*H04L 29/06* (2006.01)
*H04L 29/12* (2006.01)
*H04M 7/12* (2006.01)

(52) U.S. Cl.
CPC ........ *H04M 7/0075* (2013.01); *H04L 61/106* (2013.01); *H04L 61/605* (2013.01); *H04L 65/103* (2013.01); *H04L 65/104* (2013.01); *H04L 65/1006* (2013.01); *H04L 65/1016* (2013.01); *H04L 65/1069* (2013.01); *H04M 7/123* (2013.01)

(58) Field of Classification Search
CPC . H04L 65/1016; H04L 65/1069; H04L 12/66; H04L 65/1006; H04L 29/06027; H04L 29/06; H04W 80/10; H04W 92/02; H04M 7/123

See application file for complete search history.

(56) References Cited

U.S. PATENT DOCUMENTS

| | | | |
|---|---|---|---|
| 6,871,070 B2 | 3/2005 | Ejzak | |
| 6,996,087 B2 | 2/2006 | Ejzak | |
| 7,103,010 B2 | 9/2006 | Melideo | |
| 7,463,615 B2 | 12/2008 | Vassilovski et al. | |
| 7,836,487 B2 * | 11/2010 | Walker Pina | ....... H04L 63/0815 726/3 |

(Continued)

*Primary Examiner* — Faruk Hamza
*Assistant Examiner* — Aixa Guadalupe-Cruz
(74) *Attorney, Agent, or Firm* — Guntin & Gust, PLC; Mark Wilinski

(57) ABSTRACT

A system for communicating with an Internet Protocol Multimedia Subsystem (IMS) network is provided. A system that incorporates teachings of the present disclosure may include, for example, an intermediate node having a controller element to receive from a non IP Multimedia Subsystem (IMS) compliant node a Session Initiation Protocol (SIP) message having a calling party number and a called party number, and insert in the SIP message a request that instructs a receiving IMS-compliant node to bypass validation of the calling party number. Additional embodiments are disclosed.

20 Claims, 3 Drawing Sheets

(56) References Cited

U.S. PATENT DOCUMENTS

2007/0061397 A1     3/2007   Gregorat et al.
2007/0071221 A1     3/2007   Allen et al.
2008/0254794 A1*   10/2008   Grayson ............... H04W 12/06
                                                                                           455/435.1

* cited by examiner

100

200

SYSTEM FOR COMMUNICATING WITH AN INTERNET PROTOCOL MULTIMEDIA SUBSYSTEM NETWORK

CROSS-REFERENCE TO RELATED APPLICATION(S)

This application is a continuation of U.S. patent application Ser. No. 11/760,255 filed Jun. 8, 2007 by Jackson et al., entitled "System for Communicating with an Internet Protocol Multimedia Subsystem Network." All sections of the aforementioned application(s) are incorporated herein by reference in its entirety.

FIELD OF THE DISCLOSURE

The present disclosure relates generally to communication techniques and more specifically to a system for communicating with an Internet Protocol Multimedia Subsystem (IMS) network.

BACKGROUND

The adoption of an IP Multimedia Subsystem (IMS) network architecture to merge legacy Voice over IP (VoIP) services with Public Switched Telephone Network (PSTN) services can give rise to interoperability issues. For example, a non-IMS compliant server will not able to redirect a call through an IMS network due in part to a validation process requiring authentication credentials for the calling party number. The call can also fail when the IMS network detects that a communication device associated with the calling party number is not registered in the IMS network or is currently engaged in a call. In yet another scenario, the call can fail when originating treatment is applied to the calling party number by a feature server of the IMS network.

A need therefore arises for a system for communicating with an IMS network.

DETAILED DESCRIPTION

Embodiments in accordance with the present disclosure provide a system for communicating with an IMS network.

In a first embodiment of the present disclosure, a computer-readable storage medium can have computer instructions for receiving a Session Initiation Protocol (SIP) message having a calling party number and a called party number. The SIP message can correspond to a request to establish communications with a communication device by way of an IP Multimedia Subsystem (IMS) network according to the called party number. The storage medium can further have computer instructions for inserting in the SIP message a request to bypass validation of the calling party number, and forwarding the updated SIP message to a network element of the IMS network to establish communications with the communication device.

In a second embodiment of the present disclosure, an intermediate node can have a controller element to receive from a non-IMS compliant node a SIP message having a calling party number and a called party number, and insert in the SIP message a request that instructs a receiving IMS-compliant node to bypass validation of the calling party number.

In a third embodiment of the present disclosure, an IMS-compliant node can have a controller element to receive a SIP INVITE message, and forego a process to validate a calling party number in the SIP INVITE message.

In a fourth embodiment of the present disclosure, an non-IMS compliant node can have a controller element to transmit a SIP message to a session border controller that inserts a request in the SIP message to bypass at least one among a validation and originating treatment of the calling party number.

Figure 1:
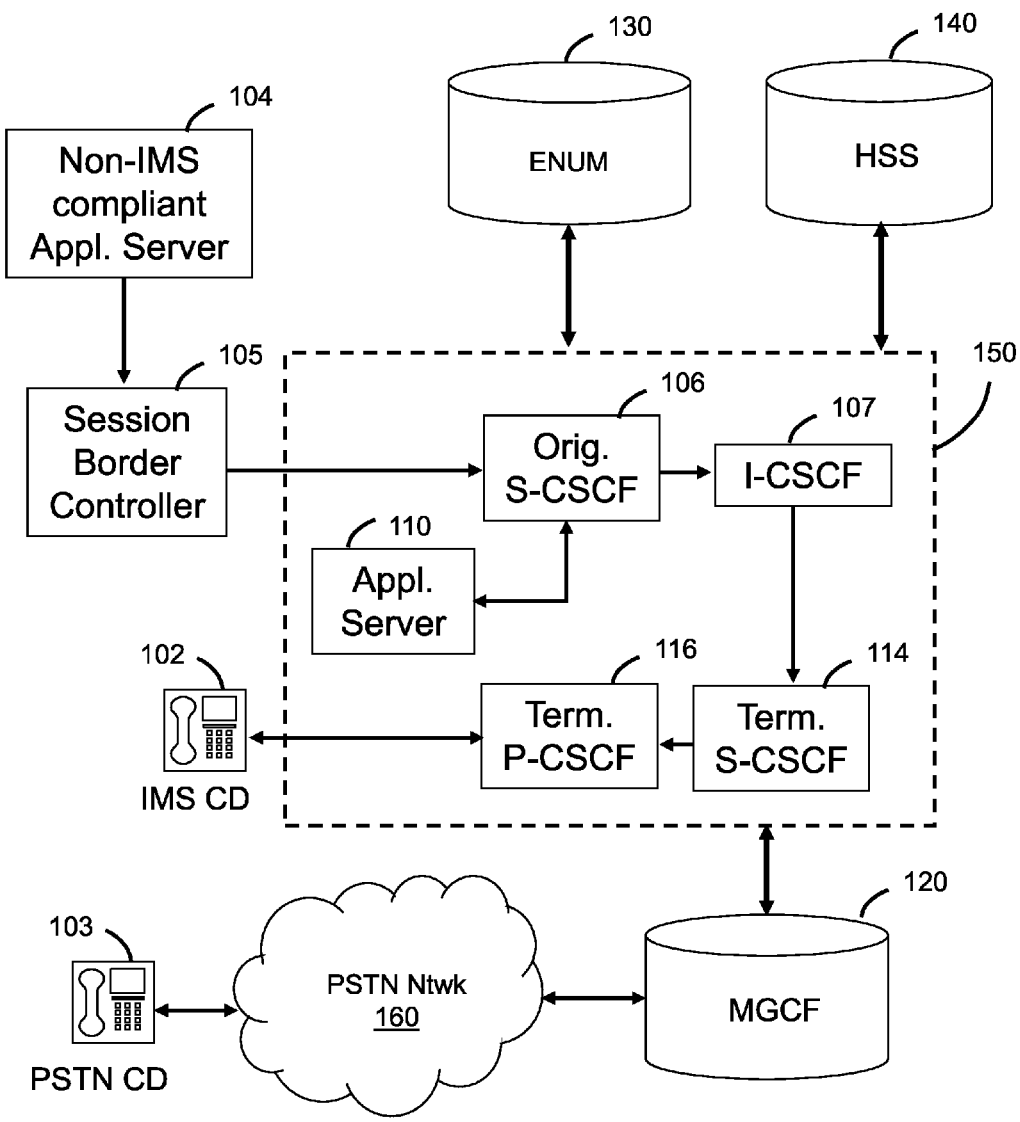
FIG. 1 depicts an exemplary embodiment of a communication system.

FIG. 1 depicts an exemplary communication system 100. The communication 100 can comprise a Home Subscriber Server (HSS) 140, a tElephone NUmber Mapping (ENUM) server 130, and common network elements of an IMS network 150. A non-IMS compliant application server 104 can be coupled to the IMS network by way of a session border controller 105. The IMS network 150 can also be coupled to an IMS compliant communication device (CD) 102 or a PSTN CD 103 using a Media Gateway Control Function (MGCF) 120 that connects the call through a common PSTN network 160.

To accomplish a communication session between devices, the IMS network 150 can utilize an originating Serving Call Session Control Function (S-CSCF) 106. The S-CSCF 106 can submit queries to the ENUM server 130 to translate an E.164 telephone number to a SIP Uniform Resource Identifier (URI) if the targeted communication device is IMS compliant. If the targeted communication device is a PSTN device, the ENUM server 130 will respond with an unsuccessful query and the S-CSCF 106 will forward the call to the MGCF 120.

When the ENUM server 130 returns a SIP URI, the SIP URI is used by an Interrogating CSCF (I-CSCF) 107 to submit a query to the HSS 140 to identify a terminating S-CSCF 114 associated with a targeted IMS communication device such as reference 102. Once identified, the I-CSCF 107 can submit the SIP INVITE to the terminating S-CSCF 114 which then identifies a terminating P-CSCF 116 associated with the targeted CD 102. The P-CSCF 116 can then signals the CD 102 to establish communications. The aforementioned process is symmetrical. Accordingly, the terms "originating" and "terminating" in FIG. 1 can be interchanged.

The application server 110 in the IMS network 150 can be used to perform originating treatment functions on the calling party number received by the S-CSCF 106 in the SIP INVITE message. Originating treatment functions can include determining whether the calling party number has international calling services, and/or is requesting special telephony features (e.g., *72 forward calls, *73 cancel call forwarding, etc.).

The non-IMS compliant application server 104 can generally represent a device that performs a telephony task directed to the IMS network 150 which is in whole or in part non-compliant with protocol standards used by an IMS network such as those defined by 3GPP (Third Generation Partnership Protocol). In one instance, the non-IMS compliant application server 104 can operate as a unified messaging system providing among other things voicemail services to subscribers. When a subscriber of the unified messaging system retrieves voicemail from an inbox, the system can offer the subscriber the ability to redirect the active call to the party that left the voicemail message. The redirected call can be SIP or H.323 compliant, but may not necessarily comply with all the protocol directives established by 3GPP for IMS networks.

Consequently, the IMS network 150 can prevent the redirected call from reaching the targeted CD 102. The session border controller 105 which comprises computing and telephony technology can be utilized to make adjustments to the SIP signaling information to resolve in part this issue.

Figure 2:
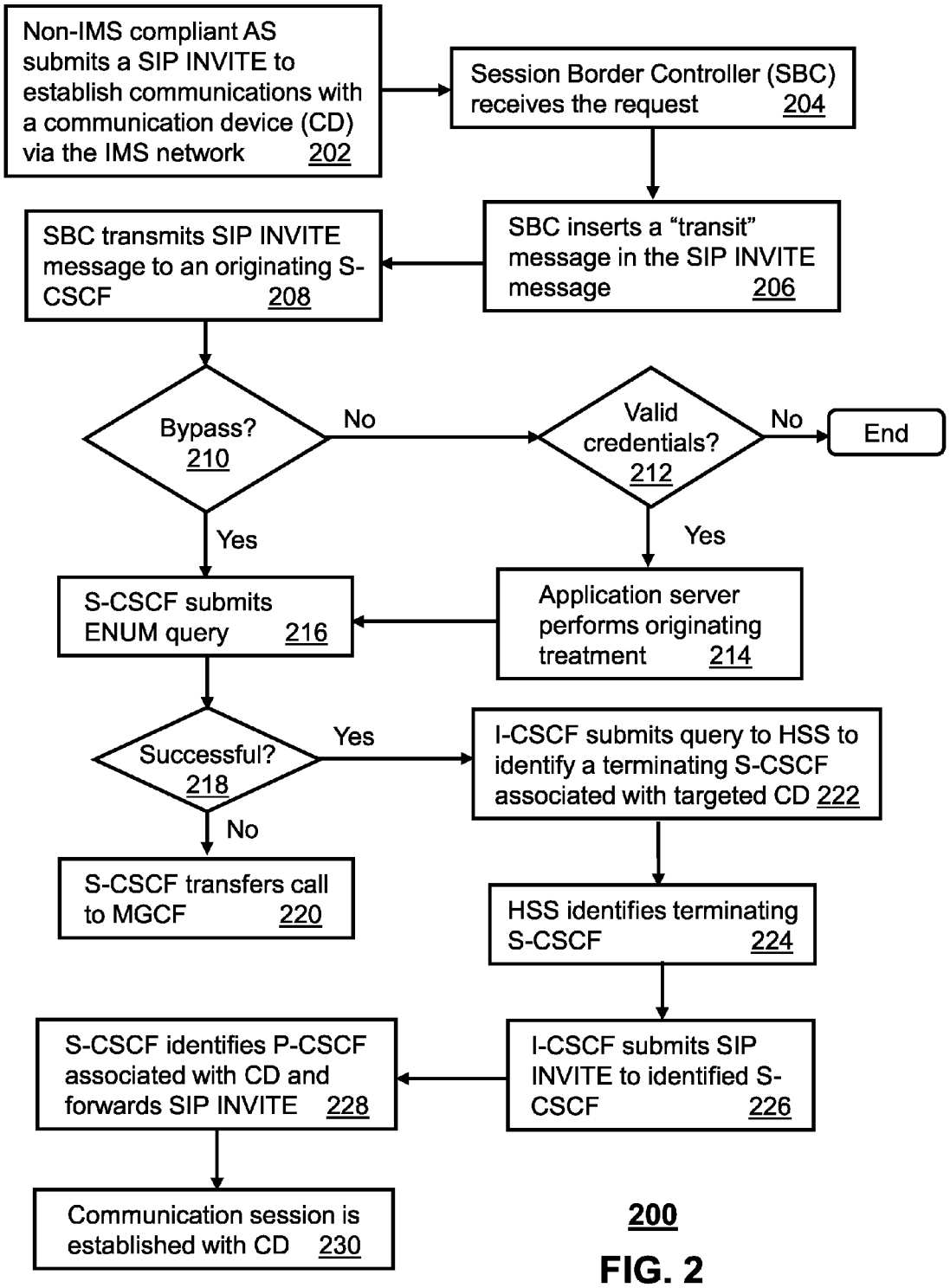
FIG. 2 depicts exemplary method operating in portions of the IMS network.

FIG. 2 depicts an exemplary method 200 operating in portions of the communication system 100 that can address the foregoing interoperability issue. Method 200 begins with step 202 in which the non-IMS compliant AS 104 submits a SIP INVITE to establish communications with a communication device by way of the IMS network 150. This step can be responsive to the example given above whereby a subscriber of a unified messaging system selects the option to redirect the active call to a party that left a voicemail message. In this illustration the non-IMS compliant AS 104 can be a subsystem (e.g., the voicemail server) of the unified messaging system, or support all functions common to the unified messaging system.

In step 204, the session border controller (SBC) 105 can be programmed to receive the SIP INVITE, and in step 206 insert a bypass request in a header of the SIP INVITE message. The bypass request can be a string of characters which informs a downstream network element of the IMS network 150 that special consideration must be given to the SIP INVITE. The header of the SIP INVITE can for example include a Domain Name Server (DNS) name of an S-CSCF, a port number (e.g., 5060) and the bypass request (e.g., a character string such as "transit"). The DNS name can be selected by the SBC 105 from a group of S-CSCF's that it can communicate with. For illustration purposes, the SBC 105 can submit in step 208 the updated SIP INVITE with the bypass request to the originating S-CSCF 106 shown in FIG. 1.

In step 210 the originating S-CSCF 106 checks a header in the SIP INVITE to determine if a bypass request has been inserted. If a bypass request is not present in the SIP INVITE it is likely because the SIP INVITE originated from an IMS-compliant device. In this case, the originating S-CSCF proceeds to step 212 where it retrieves credentials from the HSS 140 associated with the calling party number of the SIP INVITE message and determines if the authentication credentials supplied by the SIP INVITE message are valid. If the credentials are not valid, the call is terminated and a common error message is submitted to the device that originated the SIP INVITE.

If the authentication credentials are valid, the originating S-CSCF 106 forwards in step 214 the SIP INVITE to an application server 110 that serves as a feature server that performs an originating treatment function on the calling party number as previously described. If originating treatment is successful, the originating S-CSCF 106 proceeds to step 216 where it submits an ENUM query with an E.164 number associated with the called party number retrieved from the SIP INVITE.

Referring back to step 210, if the originating S-CSCF 106 detects that a bypass request has been made by way of the "transit" string located in the header of the SIP INVITE message, the originating S-CSCF proceeds to step 216 where it performs the ENUM query referred to earlier without validation or originating treatment applied to the calling party number, thereby avoiding compatibility issues with the non-IMS compliant application server 104. In step 218, the S-CSCF 106 proceeds to step 220 where it forwards the call to the MGCF 120 responsive to the ENUM server 130 indicating it cannot find a SIP URI for the E.164 number. In this case, the targeted CD is a PSTN device such as shown by reference number 103 in FIG. 1. The MGCF 120 establishes communications with the targeted CD 103 by way of the PSTN network 160 utilizing common signaling techniques such as SS7.

If on the other hand, the ENUM server 130 responds in step 218 with a SIP URI, then the targeted CD is an IMS CD such as shown by reference 102 in FIG. 1. In this instance, the originating S-CSCF 106 conveys the SIP URI to the I-CSCF 107. The I-CSCF 107 in turn submits in step 222 a query to the HSS 140 with the SIP URI to identify the terminating S-CSCF 114 of the targeted IMS CD 102.

Once the HSS 140 identifies the terminating S-CSCF 114 in step 224, the I-CSCF 107 proceeds to step 226 where it submits the SIP INVITE to the identified terminating S-CSCF 114. The terminating S-CSCF 114 in step 228 identifies and forwards the SIP INVITE to the terminating P-CSCF 116 associated with the CD 102, which establishes a communication session with said CD.

Once the call is answered by the called party using the IMS CD 102 (or the PSTN CD 103 if the targeted CD is a PSTN device), the non-IMS compliant AS 104 releases media for the call and the redirection process is completed.

Method 200 provides a means for a non-IMS compliant application server 104 to establish communications with a communication device by way of an IMS network. This process thereby eliminates the need for the non-IMS compliant server to rely on PSTN network equipment to establish communications with other devices in a communication system.

Upon reviewing the embodiments disclosed, it would be evident to an artisan with ordinary skill in the art that said embodiments can be modified, reduced, or enhanced without departing from the scope and spirit of the claims described below. For example, the session border controller 105 can be integrated with the non-IMS compliant application server 104. A SIP INVITE message can be modified in other ways to convey a bypass request. For example, other character strings can be used. The bypass request can be positioned in other fields of the SIP INVITE which do not include the header, and so on.

Additionally, a network element of the IMS network 150 such as the originating S-CSCF 106 can be programmed to forego validation and originating treatment of a calling party number without a bypass request message inserted in the SIP INVITE. In this embodiment, the non-IMS compliant application server 104 can be coupled to the originating S-CSCF 106 without an intermediate node such as the session border controller 105. This can be accomplished in several ways.

For example, the originating S-CSCF 106 can be programmed to know that the non-IMS compliant server 104 utilizes a specific static IP address. When a SIP INVITE message is received with the known static IP address, the originating S-CSCF 106 bypasses validation and originating treatment.

Alternatively, the originating S-CSCF 106 can determine the source of the SIP INVITE by processing a user agent field in the SIP INVITE message. The user agent field can be used to identify the manufacturer and model of the device submitting the SIP INVITE. The originating S-CSCF 106 can have in its database a list of manufacturers and models which are known to be non-IMS compliant application servers. Thus when such manufacturer and model combinations are detected in the user agent field, validation and originating treatment is bypassed.

In yet another embodiment, the non-IMS compliant application server 104 can be coupled to the originating S-CSCF 106 by way of a physical or logical interface from which the S-CSCF knows a SIP INVITE has originated from the non-IMS compliant application server.

It would be evident to an artisan of ordinary skill in the art that any technique in which the originating S-CSCF 106 can determine the source of a SIP INVITE can be used to perform special processing which eliminates compatibility such as described in the present disclosure without inserting a bypass request field in the SIP INVITE message.

Other suitable modifications can be applied to the present disclosure without departing from the scope of the claims below. Accordingly, the reader is directed to the claims for a fuller understanding of the breadth and scope of the present disclosure.

Figure 3:
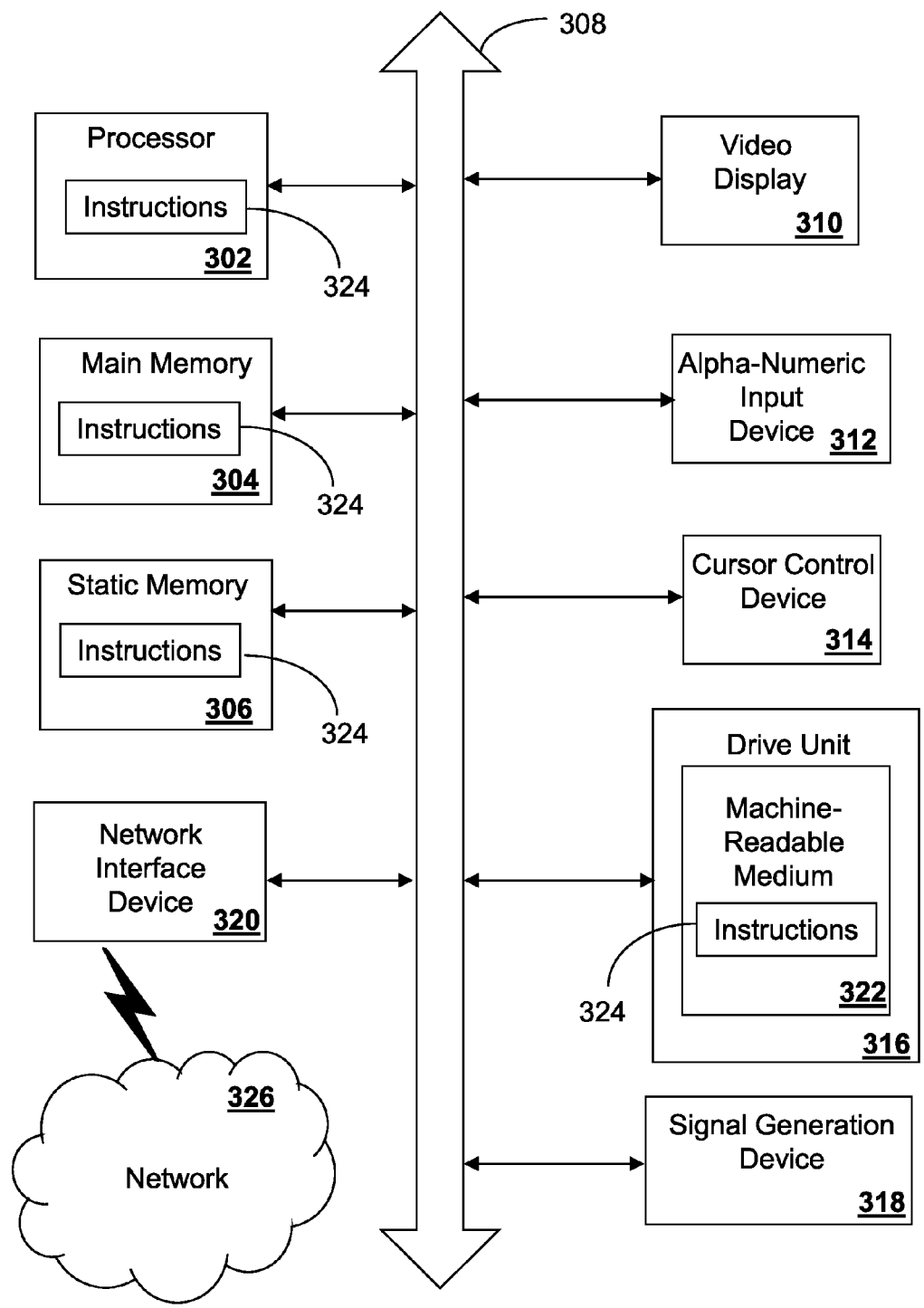
FIG. 3 depicts an exemplary diagrammatic representation of a machine in the form of a computer system within which a set of instructions, when executed, may cause the machine to perform any plurality of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: computer-readable storage medium; solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage medium, comprising executable instructions that, when executed by a processor, facilitate performance of operations, comprising:
   receiving, from a server, a session initiation protocol message having a calling party number and a called party number, wherein the session initiation protocol message corresponds to a request from a first communication device to initiate communications with a second communication device by way of an internet protocol multimedia subsystem network according to the called party number;
   determining from a first identifier associated with the server whether the server is known to be non-compliant with protocol standards used by the internet protocol multimedia network, wherein the first identifier comprises a static IP address of the server;
   if the server is determined to be known to be non-compliant, submitting a first query with the called party number to a telephone number mapping database;
   if the server is determined to be not known to be non-compliant, determining whether the session initiation protocol message comprises a bypass instruction;
   if the session initiation protocol message is determined to comprise a bypass instruction, submitting a second query with the called party number to the telephone number mapping database;
   if the session initiation protocol message is determined to not comprise a bypass instruction:
      sending a request to a home subscriber server for first credentials associated with the calling party number;
      receiving the first credentials associated with the calling party number from the home subscriber server;
      comparing the first credentials with second credentials that are received with the session initiation protocol message to determine if the first communication device is authorized for the internet protocol multimedia subsystem network; and
      submitting a third query with the called party number to the telephone number mapping database;
   receiving a uniform resource identifier from the telephone number mapping database responsive to one of the first query, the second query, or the third query;
   transmitting the session initiation protocol message to an application server of the internet protocol multimedia subsystem network; and
   transmitting a session initiation protocol invite message to a terminating serving call session control function server identified by the home subscriber server according to the uniform resource identifier for initiating of the communications between the first communication device and the second communication device.

2. The machine-readable storage medium of claim 1, wherein the machine-readable storage medium operates in a serving call session control function server.

3. The machine-readable storage medium of claim 1, wherein the operations further comprise determining an identity of the first communication device from information in a user agent field in the session initiation protocol message.

4. The machine-readable storage medium of claim 3, wherein the operations further comprise comparing the information in the user agent field with a database of communication device identifiers.

5. The machine-readable storage medium of claim 1, wherein the first identifier comprises a user agent field of the session initiation protocol message.

6. The machine-readable storage medium of claim 1, wherein the application server performs an origination treatment function on the calling party number.

7. The machine-readable storage medium of claim 1, wherein the operations further comprise retrieving the called party number from the session initiation protocol message.

8. The machine-readable storage medium of claim 1, wherein the bypass instruction comprises a string of characters in the session initiation protocol message.

9. A serving call session control function server, comprising:
   a processor; and
   a memory that stores executable instructions that, when executed by the processor, facilitate performance of operations, comprising:
      receiving, from a server, a session initiation protocol message having a calling party number and a called party number for a communications session between a first communication device and a second communication device by way of an internet protocol multimedia subsystem network;

retrieving the called party number from the session initiation protocol message;

determining from a first identifier associated with the server whether the server is known to be non-compliant with protocol standards used by the internet protocol multimedia network;

if the server is determined to be known to be non-compliant, submitting a first query with the called party number to a telephone number mapping database;

if the server is determined to be not known to be non-compliant, determining whether the session initiation protocol message comprises a bypass instruction, wherein the bypass instruction comprises a string of characters;

if the session initiation protocol message is determined to comprise a bypass instruction, submitting a second query with the called party number to the telephone number mapping database;

if the session initiation protocol message is determined to not comprise a bypass instruction:
authenticating first credentials of the session initiation protocol message against second credentials associated with the calling party number obtained from a home subscriber server; and
submitting a third query with the called party number to the telephone number mapping database;

receiving a uniform resource identifier from the telephone number mapping database responsive to one of the first query, the second query, or the third query; and transmitting a session initiation protocol invite message to a terminating serving call session control function server identified by the home subscriber server according to the uniform resource identifier for initiating of the communications between the first communication device and the second communication device.

10. The serving call session control function server of claim 9, wherein the operations further comprise determining an identity of the first communication device from information in a user agent field in the session initiation protocol message.

11. The serving call session control function server of claim 10, wherein the operations further comprise comparing the information in the user agent field with a database of communication device identifiers.

12. The serving call session control function server of claim 10, wherein the information in the user agent field comprises model a number that is associated with the first communication device.

13. The serving call session control function server of claim 9, wherein the first identifier comprises a static IP address of the server.

14. The serving call session control function server of claim 9, wherein the operations further comprise transmitting the session initiation protocol message to an application server of the internet protocol multimedia subsystem network, wherein the application server performs an origination treatment function on the calling party number.

15. The serving call session control function server of claim 9, wherein the serving call session control function server is coupled to the server that is known to be non-compliant by way of a physical interface, a logical interface, or a combination thereof.

16. A method, comprising:
receiving, from a server by a system comprising a processor, a session initiation protocol message having a calling party number and a called party number for a communications session between a first communication device and a second communication device by way of an internet protocol multimedia subsystem network;
retrieving, by the system, the called party number from the session initiation protocol message;
determining, by the system, according to a first identifier associated with the server whether the server is known to be non-compliant with protocol standards used by the internet protocol multimedia network;
if the server is determined to be not known to be non-compliant, determining, by the system, whether the session initiation protocol message comprises a bypass instruction;
if the session initiation protocol message is determined to not comprise a bypass instruction, authenticating, by the system, first credentials of the session initiation protocol message against second credentials associated with the calling party number obtained from a home subscriber server;
submitting, by the system, a first query with the called party number to a telephone number mapping database;
receiving, by the system, a uniform resource identifier from the telephone number mapping database responsive to the first query;
transmitting, by the system, the session initiation protocol message to an application server of the internet protocol multimedia subsystem network; and
transmitting, by the system, a session initiation protocol invite message to a terminating serving call session control function server identified by the home subscriber server according to the uniform resource identifier for initiating of the communications between the first communication device and the second communication device.

17. The method of claim 16, wherein the bypass instructions comprises a string of characters.

18. The method of claim 16, further comprising determining, by the system, an identity of the first communication device from information in a user agent field in the session initiation protocol message.

19. The method of claim 18, further comprising comparing, by the system, the information in the user agent field with a database of communication device identifiers.

20. The method of claim 16, wherein the first identifier comprises a static IP address of the server.

* * * * *